United States Patent [19]

Kissel

[11] Patent Number: 5,076,358

[45] Date of Patent: Dec. 31, 1991

[54] PETROLEUM RECOVERY WITH ORGANONITROGEN THIOCARBONATES

[75] Inventor: Charles L. Kissel, Anaheim, Calif.

[73] Assignee: Union Oil Company of California, Los Angeles, Calif.

[21] Appl. No.: 400,521

[22] Filed: Aug. 30, 1989

Related U.S. Application Data

[63] Continuation-in-part of Ser. No. 362,345, Jun. 6, 1989, abandoned, which is a continuation-in-part of Ser. No. 222,801, Jul. 22, 1988, abandoned.

[51] Int. Cl.$^5$ .............................................. E21B 93/12
[52] U.S. Cl. .................................... 166/275; 166/304; 166/305.1; 166/307; 252/8.551; 252/8.554
[58] Field of Search .............. 208/21, 24, 27; 175/64; 166/304, 310, 275, 305.1, 307; 252/8.551, , 8.552, 8.553, 46.4, 45, 8.554

[56] References Cited

U.S. PATENT DOCUMENTS

| | | | |
|---|---|---|---|
| 1,844,883 | 2/1932 | De Groote | 166/304 |
| 2,873,253 | 2/1959 | Stanphill | 166/304 |
| 3,077,929 | 2/1963 | Fetkovich | 166/304 |
| 3,241,614 | 3/1966 | Bertness | 166/304 |
| 3,724,552 | 4/1973 | Snavely, Jr. | 166/304 |
| 4,476,930 | 10/1984 | Watanabe | 166/310 |
| 4,726,144 | 2/1988 | Young et al. | 47/58 |

*Primary Examiner*—Anthony McFarlane
*Attorney, Agent, or Firm*—Gregory F. Wirzbicki; Michael H. Laird

[57] ABSTRACT

The effectiveness of secondary and tertiary methods for recovering petroleum from a petroleum-bearing formations is enhanced by introducing into said formation a safe form of carbon disulfide comprising one or more salts of tri- and tetrathiocarbonic acid.

76 Claims, No Drawings

PETROLEUM RECOVERY WITH ORGANONITROGEN THIOCARBONATES

RELATED APPLICATIONS

The present application is (1) a continuation-in-part of application Ser. No. 07/362,345, filed June 6, 1989 now abandoned, which in turn is a continuation-in-part of application Ser. No. 07/222,801, filed July 22, 1988 now abandoned, both of said applications being incorporated herein by reference in their entirety.

BACKGROUND OF THE INVENTION

1. Technical Field

The invention relates generally to the field of petroleum production and, more particularly, to the enhancement of the recovery of oil from petroleum-bearing formations undergoing secondary and tertiary recovery operations.

2. Background of the Art

In the production of oil from petroleum-bearing reservoirs, it usually is not possible to recover all of the oil in place by primary recovery methods based on the natural forces present in the reservoir. To increase the recovery of oil from these reservoirs a variety of supplemental "secondary" and "tertiary" recovery techniques are customarily employed. The most widely used of these supplemental recovery techniques is water flooding which involves injecting water into the reservoir. As the water moves through the reservoir, it acts to displace the oil therein and carry it to a production system comprising one or more wells from which the oil is recovered.

It has long been recognized that the interfacial tension between the injected water and the reservoir oil, the relative mobilities of the reservoir oil and injected-water, and the wetability characteristics of rock surfaces within the reservoir are important factors influencing the amount of oil potentially recoverable by water flooding. However, where heavy, viscous oils are involved, it may also be necessary to add one or more solvents to "thin out" the oil and lower its viscosity before it is able to move more freely through the reservoir to the production wells. Typical solvents used for this purpose include naphtha, diesel fuel, kerosine, butane and natural gas.

Another widely used water flooding technique involves the addition of one or more surfactants to the flood water to lower the oil-water interfacial tension and/or to alter the wetability characteristics of the reservoir rock. Processes which involve the injection of aqueous surfactant solutions are commonly referred to as surfactant water flooding or as low tension water flooding, the latter term having reference to the mechanism involving the reduction of the oil-water interfacial tension. It has also been proposed to add viscosifiers such as polymeric thickening agents to all or part of the injected water to increase the viscosity thereof, thus decreasing the mobility ratio between the injected water and oil and improving the sweep efficiency of the water flood. Among the materials used for this purpose are cationic polyacrylamides, which also help in the displacement of the oil adhering to the rocks in the formation. In still other cases, sulfuric acid may be introduced into oil formations where waxy asphaltenes and maltenes are present as constituents of the oil to form detergent sulfonates therein.

It is also known, as disclosed in U.S. Pat. No. 2,358,665, the teachings of which are incorporated in their entirety by reference, that carbon disulfide can be used as an oil solvent to enhance the recovery of oil in secondary and tertiary oil production operations. Carbon disulfide is an effective solvent for oil since its relatively high density and lack of miscibility with water allow it to achieve close contact with the oil-retaining sands and rocks in the reservoir. However, the use of carbon disulfide for this purpose has been largely discontinued, due to the hazards associated with its extreme volatility, flamability and toxicity.

Accordingly, a significant need exists for a relatively inexpensive, safe, yet effective method for introducing carbon disulfide into a well as a means for enhancing the recovery of residual oil from petroleum wells. The present invention provides thiocarbonate compositions as such a safe and effective means for introducing $CS_2$ into an oil well to enhance the recovery of oil therefrom.

SUMMARY OF THE INVENTION

The invention involves methods enhancing the recovery of oil from underground wells by introducing into the well, as a safe source of carbon disulfide, one or more thiocarbonate compounds of the form $(X)_2(CS_y)_z$ wherein X is one or more cationic salt-forming moieties selected from ammonium, alkali metals, and organonitrogen radicals such as organically substituted ammonium radicals of the form $RH_3N^+$, $R_2H_2N^+$, $R_3HN^+$ and $R_4N^+$, wherein each R is independently the same or different organic radical, y ranges from 3 to 4, and z is the valence of X. Organonitrogen radicals include those derived from organically substituted ammonium compounds, primary, secondary and tertiary substituted amines, ring type compounds and other organic compounds having at least one nitrogen atom which can act as a cationic salt forming moiety.

Under proper, i.e., acidic, conditions the thiocarbonate compounds break down and release carbon disulfide inside the petroleum-bearing formation. In use, the thiocarbonate may be added to the well in any form and/or may be added in combination with water and/or an acid to accelerate decomposition of the thiocarbonate to form carbon disulfide. When added to a mixture of water and oil, such compounds function to enhance the recovery of oil by dissolving it and removing it from rocks in the formation to which it may be attached.

In addition, where substituted ammonium or organonitrogen compounds having surfactant properties are used as the cationic salt-forming moiety, surfactants can be formed in the water phase to even further enhance the effectiveness of the oil recovery operation.

When the method of the present invention is applied, the daily production of crude oil from the reservoir is typically increased from about 10% to about 300%, by volume.

DETAILED DESCRIPTION OF THE INVENTION

In the present invention, the recovery of petroleum from a subterranean reservoir is enhanced by introducing into said reservoir a solution comprising one or more salts of tri- and tetrathiocarbonic acid under conditions leading to the decomposition of said salt to form free carbon disulfide therein. Such thiocarbonate compounds have the general formula $(X)_2(CS_y)_z$, wherein X is a cationic salt-forming moiety selected from ammonium, alkali metals (i.e., the group IA metals, e.g., lithium, sodium potassium, cesium and rubidium), organonitrogen radicals usually containing from 1 to about 200 carbon atoms, preferably between 1 and 100 carbon atoms, and most preferably between 1 and about 50 carbon atoms and at least one nitrogen atom capable of acting as a cationic salt-forming moiety, and mixtures thereof, with y ranging from 3 to 4 and z being the valence of X. Such compounds include substituted ammonium radicals of the general form $R_4N^+$, wherein each R is independently hydrogen or the same or different organic radical having from 1 to about 50 carbon atoms, preferably from 1 and about 30 atoms, provided at least one of said R groups is an organic radical.

It is found that these compounds will, under the proper, i.e., acidic conditions, readily break down to liberate carbon disulfide. When the salt forming moiety, X, is either ammonium or an alkali metal, preferably sodium or potassium, the main reactions observed are the dissolution of otherwise non-recoverable oil and the consequent lowering of its viscosity for movement to the recovery wells. Where the nature of the operation is such that the addition of other chemicals, such as detergents, is not needed to enhance oil recovery, compounds of this type are preferred.

However, where the structure of the formation and/or the composition of the the oil require that a detergent be added to the flood water to enhance oil recovery, then thiocarbonate compounds wherein X is derived from organonitrogen cationic salt-forming moieties having detergent properties when liberated by the decomposition of the salt in the formation are preferred. Preferred cations for this purpose are derived from (1) organically substituted primary, secondary, tertiary or quaternary ammonium (the latter being generically identified by the term "quat"), with the organic substituents having a total of at least 5, preferably at least 8, more preferably at least about 10, and even more preferably from about 10 to about 50 carbon atoms, (2) mono, secondary and tertiary substituted polyalkoxylated (EO), polypropoxylated (PO), EO/PO copolymers and preferably polyethoxylated, amines and polyamines (3) polyethyleneimines and (4) betaines. Most preferred as compounds for providing surfactant properties are those in which X is a cation derived from primary substituted ammonium salts of the form $R^{15}NH_3A$, wherein $R^{15}$ is a fatty acid residue having from 10 to about 18 carbon atoms, with A being an anion, typically chloride, bromide, hydroxide, nitrate, sulfide, sulfate, acetate, formate, hydroxyacetate, with the chloride being preferred. Regardless of the particular organonitrogen cationic moiety used, it is found that when the thiocarbonate decomposes to liberate carbon disulfide, the surfactant compound is also liberated with a consequent improvement in the overall effectiveness of the recovery operation. Compounds falling within the groups identified above as (2), (3) and (4) offer the further advantage of improving the water/oil mobility ratio.

In use, it is found that thiocarbonates as defined hereinabove tend to be both water soluble and oil dispersible, and can be prepared, stored, and used in aqueous solutions. The solution is stable during prolonged periods of storage in a closed container, exhibit low vapor pressure, and are generally not flammable.

Ammonium thiocarbonate salts can be prepared by the procedures generally described in U.S. Pat. No. 4,476,113, the disclosure of which is incorporated herein, by reference, in its entirety. Organically substituted ammonium salts can be prepared in an analogous fashion, with the ammonium reactant used in the process described in U.S. Pat. No. 4,476,113 being replaced by a soluble substituted ammonium salt, preferably the hydroxide or sulfide. This is then reacted with hydrogen sulfide, carbon disulfide, water, and, where a tetrathiocarbonate salt is desired, sulfur, in the proper proportions, according to the following general equations:

$$(R_4N)_2S + CS_2 \rightarrow (R_4N)_2CS_3 \tag{1}$$

$$2(R_4N)_2OH + H_2S + CS_2 \rightarrow (R_4N)_2CS_3 + 2H_2O \tag{2}$$

$$(R_4N)_2S + S + CS_2 \rightarrow (R_4N)_2CS_4 \tag{3}$$

$$2(R_4N)_2OH + H_2S + S + CS_2 \rightarrow (R_4N)_2CS_4 + 2H_2O \tag{4}$$

each of the radicals constituting $R_4$ is, independently, hydrogen or the same or different organic radicals, provided that at least one of said radicals is an organic radical. Preferably, the reactions are conducted under conditions which facilitate removal of the heat generated during the reaction, most of which results from the mixing of the quat and hydrogen sulfide. No particular order of component addition is required, except that the substituted ammonium salt must either be present prior to hydrogen sulfide addition or must be added concurrently with the hydrogen sulfide.

Other suitable inorganic salts and complexes of tri- and tetrathiocarbonic acid can be prepared by the methods disclosed in Assignee's copending U.S. Pat. applications, Ser. No. 07/253,139, filed Oct. 4, 1988, Ser. No. 07/260,912, filed Oct. 21, 1988 and Ser. No. 07/314,946, filed Feb. 24, 1989, all of which are incorporated herein by reference, in their entirety.

In a typical batch preparation, the required amount of water will be introduced into a container (which has cooling coils or other heat exchanging means), followed by the sequential additions of the substituted ammonium salt and hydrogen sulfide (when the hydroxide is used), sulfur (if required), and carbon disulfide.

Many variations in the foregoing preparation are possible. For example, a reduction in cooling can be obtained by using a substituted ammonium sulfide, either as a solution or solid to provide any desired amount of sulfide ion in place of the hydrogen sulfide requirement. Sulfur, if required, can be added as the solid element or dissolved in carbon disulfide. A portion of the substituted ammonium salt and the hydrogen sulfide can also be replaced with a soluble sulfide material such as alkali metal sulfide. The maximum replaced portion will usually be equivalent in sulfide content to that amount of hydrogen sulfide which would exceed the carbon disulfide molarity in a particular composition. A typical continuous-flow production of the composition involves dissolving molten sulfur in carbon disulfide using a mixing vessel which can be cooled, for example, by external recycle through a heat exchanger, followed by mixing the sulfur solution with water, the substituted ammonium salt and hydrogen sulfide in the cooled reactor.

The reactor in either a batch or continuous process should be maintained at a somewhat elevated temperature, e.g., about 25° C. to about 70° C., to promote the rapid formation of a clear solution. Stirring or other mixing of the reactor contents also is useful in this regard. A holding time of about one hour is normally sufficient for obtaining the desired product solution.

The thiocarbonate solutions obtained by the above procedures comprise aqueous solutions of up to about sixty percent by weight solute, in which solute the molarity of hydrogen sulfide can be greater than the molarity of carbon disulfide, and, preferably, said hydrogen sulfide molarity is about one-half the molarity of the substituted ammonium salt. This requirement is an important factor in obtaining an enhanced stability in the compositions of this invention. Although it is preferred that the hydrogen sulfide molarity exceed that of the carbon disulfide, the range of solute compositions includes the stoichiometric equivalents of quaternary ammonium trithiocarbonate and quaternary ammonium tetrathiocarbonate.

The solubility limit of the various thiocarbonate compositions of the present invention is up to about sixty percent by weight solute, showing some variability which is dependent upon relative amounts of the various components present. Release of carbon disulfide is rapidly accelerated upon acidification or dilution with water. The ammonium and quaternary ammonium thiocarbonate compositions are stabilized by excess sulfide against significant increases in vapor pressure, and against significant solid or immiscible liquid phase formation, during reasonable storage periods, and they also retain acceptable chemical stability during such periods.

A second, and preferred, mode of producing organonitrogen thiocarbonate salts starts with the production of a solution of an alkali metal thiocarbonate, preferably the sodium salt, as a precursor therefor. These solutions are quite stable, when concentrated, against loss of carbon disulfide and are available in relatively large quantities. Alkali thiocarbonates can be prepared by reacting the corresponding metal sulfides, either alone or mixed with elemental sulfur (when a tetrathiocarbonate is to be prepared), with carbon disulfide, preferably in aqueous media, to directly form aqueous solutions. In the alternative, the metal sulfides can be generated in situ, by reaction of hydrogen sulfide with an aqueous solution or dispersion of alkali metal salts, hydroxides, and the like.

The preparation is conveniently carried out at temperatures from about 15° C. to about 35° C., but may be conducted anywhere between about 0° C. and the boiling point of carbon disulfide, preferably under an inert or reducing gas atmosphere, to avoid oxidation of sulfur compounds to sulfur oxide moieties such as thiosulfates. The reactants are preferably provided in approximately stoichiometric amounts: one mole of metal sulfide per mole of carbon disulfide, to form the metal trithiocarbonate, and one additional mole of elemental sulfur added to form the tetrathiocarbonate. The products of this reaction have the empirical formula $X_zCS_y$ wherein z is 1 when X is a divalent cationic moiety, z is 2 when X is a monovalent cationic moiety such as ammonia or an alkali metal, and y ranges from 3 to 4. The solubility limit for alkali metal thiocarbonates in water is approximately 60 percent by weight. The solutions can be diluted with water to concentrations less than about 33 percent by weight, to avoid precipitation at low temperatures, when desired.

If desired, the solid salts may be recovered as precipitates from non-aqueous media, in which the reactants are combined as described for aqueous systems but under an inert or reducing atmosphere. However, since the aqueous solutions are substantially stable, there is usually no necessity to recover the salt as a substantially anhydrous solid. Moreover, it is generally easier to handle liquid solutions than solid thiocarbonate salts.

Organonitrogen salts of the thiocarbonates may be prepared by adding an organonitrogen compound having at least one nitrogen atom thereof capable of being a cationic salt forming moiety to this solution and then reacting the mixture. Preferred materials for this reaction are primary, secondary, tertiary or quaternary substituted ammonium compounds having the general formulas $RNH_3{}^+A^-$, $R_2NH_2{}^+A^-$, $R_3NH^+A^-$ and $R_4N^+A^-$, wherein each R group is, independently, the same or different organic radical, and $A^-$ is an anion such as chloride, bromide, hydroxide, nitrate, sulfide, sulfate, acetate, formate, hydroxyacetate, with the hydroxide and sulfide being preferred. In particular, quaternary ammonium thiocarbonates are normally substantially less soluble in water than a sodium precursor, and precipitate out. This precipitate can be easily recovered by filtration, and when stored under an inert atmosphere, will last indefinitely.

Organonitrogen thiocarbonate salts useful in the present invention may also be formed by the reaction, at atmospheric pressure, of a stabilized ammonium thiocarbonate solution prepared as described in U.S. Pat. No. 4,476,113, with a relatively nonvolatile (as compared to ammonia) substituted ammonium compound or an amine, polyamine or heterocyclic nitrogen compound at a pH of greater than about 7.0 and at a temperature just above about 90° F., it being understood that higher temperatures may be used, if the reaction is carried out in a pressure vessel such as an autoclave. In this reaction, the ammonia is replaced by the amine and driven off for subsequent recovery and reuse. Typical amine compounds useful for the present invention include primary, secondary and tertiary alkyl and hydroxyalkyl substituted amines, polyamines, and ring compounds such as pyridine.

Without intending to be constrained to any particular theory or mechanism of operation, it is presently believed that the surfactants released from the decomposing thiocarbonate salts act by forming micelles in the oil, which serve to improve the distribution of the anionic thiocarbonate in the oil. By so doing, it is believed that the carbon disulfide formed by the decomposition of the thiocarbonate anions will be in intimate contact with the oil, thus greatly enhancing the dissolving efficiency of the oil/salt mixture. It is also believed that the surfactant molecules also coat, to some degree, the surfaces contacted by oil and help to create linear flow conditions, thus reducing the power needed to pump the treated oil/water mixture out of the formation, through the surface facilities, to the oil/water separator, and beyond.

The method of the present invention may also be practiced advantageously with water/petroleum mixtures containing some proportion of volatile gases such as methane, ethane, etc. which are generally removed for separate processing and use as yet a third stream from an oil/water separator. These gas streams may also contain some amounts of water vapor and noncondensible gases such as hydrogen sulfide. To prevent corrosion from these contaminants, thiocarbonate salts which readily liberate ammonia or a volatile primary, secondary or tertiary amine having 8 or fewer carbon atoms, with all of the organic substituents on the nitrogen atom preferably being alkyl radicals, are quite useful. Such compounds themselves, or the corrosion inhibiting products of their decomposition, are readily volatile and pass into the gas phase to protect the interior surfaces of the piping and other facilities used to transport, store and process said gaseous phase.

In general use, one or more of the above-described thiocarbonates is introduced directly into the oil formation as the solid salt but, preferably, as a solution at a concentration of from about 15 to about 40 weight percent, more preferably from about 25 to about 35 weight percent. The thiocarbonate solution can either be introduced into a shut-in or producing well. Such introduction can be by any of several known methods for introducing materials into oil wells and hydrocarbon transport and processing equipment. For example, the solution either may be added through an injection well and, after flowing through the formation, removed through one or more production wells or may be treated by a "squeeze" process wherein the solution is introduced by "backflowing" into a production well and then pressurizing the well to force the dissociated carbon disulfide-containing solution into the reservoir to facilitate the dissolution of oil deposits in the area contacted by the carbon disulfide.

This procedure is particularly effective for removing waxy and/or bituminous deposits from the immediate vicinity of the well bore prior to acidizing to enhance the effectiveness of acid treatment and prevent the formation of permeability reducing deposits from the interaction of acid and bitumen. The thiocarbonate can also be introduced into the hydrocarbon phase and allowed to stand in a static mode to dissolve the oil, or it can be continuously or intermittently injected into flowing hydrocarbon. The well can remain pressured for from about 15 minutes to as much as about 3 days, or even about a week, with the longer contact periods being preferred to enhance the degree of oil recovery from the producing formation when the "squeezing" pressure is released and production resumed.

To assure that a significant proportion of the thiocarbonate has dissociated to release carbon disulfide rapidly enough to enhance, to the maximum extent possible, the recovery of oil from the zone treated, it is preferable that the thiocarbonate be substantially decomposed by the time it enters the oil-bearing formation being treated. Rapid decomposition is particularly desirable when the formation has a high water content to minimize the time required for the free carbon disulfide to contact and dissolve heavy crude oil adhering to the formation rock.

The decomposition rate can be accelerated by reducing the pH of an aqueous solution thereof. Thus, the pH of an aqueous thiocarbonate solution in contact with a hydrocarbon phase to be treated will be about 9 or less, typically about 8 or less, preferably about 7 or less and, when very rapid decomposition is desired, about 6 or less and, most preferably, 4 or less. The pH of the aqueous solution can be reduced by addition of any suitable organic or inorganic acid or low-pH buffer. Illustrative acids include hydrochloric, sulfuric, phosphoric, acetic, propionic, and other organic and inorganic acids. Typically, the pH of the solution is adjusted, and added acid or buffer introduced, if necessary, to assure decomposition of at least about 50 percent of the thiocarbonate within about 1 hour or less, usually within about 30 minutes or less and, when rapid decomposition is required, within about 15 minutes or less. Solution half-life is defined as that period of time required to effect the decomposition of one-half the total quantity of thiocarbonate to carbon disulfide and other decomposition products. About 9 to 10 half-lives are generally required to essentially complete the decomposition of the thiocarbonate.

The optimum pH required to obtain the desired degree of thiocarbonate decomposition within the required time in any particular situation can be readily determined by admixing the thiocarbonate and hydrocarbon phase under conditions existing in the zone to be treated, e.g., at the existing temperature and pressure, and periodically sampling the hydrocarbon phase and analyzing for carbon disulfide. Alternatively, the aqueous phase can be periodically sampled, when an aqueous solution is employed, and analyzed for residual thiocarbonate to determine the rate of decomposition. Decomposition rate can be further accelerated by reducing the pH, or decreased by increasing pH. Total carbon disulfide concentration in the hydrocarbon phase can be increased by increasing the rate of thiocarbonate decomposition and/or the total amount of thiocarbonate admixed with the hydrocarbon.

Significant, detectable levels of improvement in oil recovery can be achieved at thiocarbonate (equivalent carbon disulfide) concentrations of about 5% based on the weight of oil in place. Preferably, the amount of thiocarbonate used should be enough, based on the volume of hydrocarbon phase, to generate a $CS_2$ concentration ranging from about 10 to about 25 percent, although in the most severe cases, a concentration of as much as 50 percent may be required. (All percentage values herein are by volume.) In so doing it is found that the daily amount of oil recovered from a well in which a secondary or tertiary water flood treatment is being used will be increased anywhere from about 25 percent to as much as 300 percent (or even more), as compared to the daily production rate prior to treatment.

Although the primary purpose of reducing the pH of the thiocarbonate solution is to facilitate its decomposition to form carbon disulfide, it can be seen that the same acid can be used for other purposes as well, such as the treatment of the formation to enlarge the interstices in the petroleum-bearing formation to promote the easier flow of oil and water therethrough (acidizing). Accordingly, acidization of the well may be before, after or, preferably, in conjunction with said thiocarbonate injection.

It is understood that when thiocarbonate salts are added to accomplish one or more other objectives relating to the water or gas content of the oil, the above described operating procedures may have to be modified to assure that sufficient time and material are provided to accomplish these objectives as well. The exact nature of such changes will, of course, depend on the nature and magnitude of the problem or problems addressed.

The invention is further described by the following examples which are illustrative of specific modes of practicing the invention and are not intended as limiting the scope of the invention as defined by the appended claims.

EXAMPLE 1

To 10 mL of an aqueous solution containing 19 mmol of $(NH_4)_2CS_4$ and 19 mmol of $(NH_4)_2S$ in a 250 mL threenecked flask equipped with a nitrogen purge, a magnetic stirrer and an addition funnel, 27.5 grams of a 40 weight percent aqueous solution of tetraethyl ammonium hydroxide (74.8 mmol) was slowly added. The mixture was stirred and purged with nitrogen gas at room temperature with the displaced ammonia in the gas leaving the reaction flask being dissolved as the gases were passed through a scrubbing column containing 202 mL of a 0.5 N HCl solution (101 mmol). After about 18 hours, although the solution in the reaction flask still had the characteristic orange color of the the tetrathiocarbonate ion, ammonia could no longer be detected in the purge gas. Total acid neutralized in the scrubber by the displaced ammonia was 74.02 mmol, which indicated that the yield for the conversion of the ammonium ions to quat ions in the sulfide and tetrathiocarbonate was about 99 percent. The final product was, therefore, a solution containing a mixture of tetraethyl ammonium sulfide and tetraethyl ammonium tetrathiocarbonate.

EXAMPLE 2

An oil well having a gross production of oil and water rate of about 200 bbl/day, with the oil content comprising about 19 bbl of an API 16° crude, was treated with a thiocarbonate solution made according to the general procedure of Example 1. The treatment comprised squeezing about 40 bbl of solution (equivalent to about 5 bbl carbon disulfide) at a pH of about 5.0 into the well bore, after which the well remained in a static condition for about 24 hours. Twelve months prior to this treatment, the well was producing crude oil at a rate of about 50 bbl/day. In the first 24 hour period after production was resumed, the gross production rate had risen to about a 280 bbl/day gross comprising about 60 bbl crude oil (200+% improvement) and about 2 bbl carbon disulfide. After one month, while the gross production rate had decreased to about 208 bbl/day gross, the crude oil content was about 26 bbl (37% improvement) with about 0.1 bbl carbon disulfide being found therein.

In the above discussion, the term $(X)_2CS_y$ also is meant to include those compounds wherein "$(X)_2$" is, in reality, $((X^1)(X^2))$ wherein each X is a different cationic moiety. These can be different cations of the same or of a different basic type, i.e., one or more inorganic and/or organonitrogen-containing cations, such as a quat, amine, etc, or situations in which the cationic moieties impart different functions, e.g., one imparting biocidal and the other surfactant properties.

The term "organic radical," as used herein, refers to any radical containing at least one carbon atom, e.g., aliphatic and aromatic radicals. These radicals may be cyclic or acyclic, have straight or branched chains and can contain one or more hetero atoms such as sulfur, nitrogen, oxygen phosphorus and the like. Further, they can be substituted with one or more substituents such as thiol, nitro, amino, nitrile and halogen radicals or groups. In addition, the organic radicals may contain aryl groups, such as arylalkyl and alkylaryl groups, but preferably are substituted or unsubstituted aliphatic radicals, and even more preferably, saturated aliphatic radicals, such as straight or branched chain alkyl groups, cycloalkyl groups, alkyl substituted cycloalkyl and cycloalkyl substituted alkyl groups, all of which are preferably unsubstituted with any of the substituents listed above.

Numerous variations and modifications of the concepts of this invention will be apparent to one skilled in the art. For example, when diamines or triamines are used as as the compounds from which the cationic moiety is derived, generally only one of the amine groups is active. However, with suitable techniques, a second of the amine groups can be induced to interact with the anionic moiety so to give materials with still different structures and properties. In still other cases, polymeric structures can be formed by reacting the second amine group with one or more olefinically unsaturated materials such as vinyl chloride or acrylic acid. Consequently, in view of the foregoing disclosure, such derivatives are intended to be encompassed within the scope of this invention as defined by the following claims.

I claim:

1. A method for enhancing the recovery of petroleum from a production well penetrating a petroleum-bearing formation, comprising introducing into said formation one or more thiocarbonate salts of the form $(X)_2(CS_y)_z$, wherein X is an organonitrogen radical, y ranges from 3 to 4, and z is the valence of X, said thiocarbonate salt being introduced into said petroleum-bearing formation through one or more injection wells and with the petroleum being removed from said formation, at least in part, through said production well at a daily crude oil production rate.

2. The method of claim 1 wherein sufficient thiocarbonate salt is introduced into said petroleum-bearing formation to provide a carbon disulfide concentration corresponding to at least 5 percent of the daily crude oil production rate from said production well.

3. The method of claim 1 wherein said thiocarbonate salt is introduced into said petroleum-bearing formation at a carbon disulfide concentration corresponding to between about 5 to about 50 percent of the daily crude oil production rate from said production well.

4. The method of claim 1 wherein said thiocarbonate salt is introduced into said petroleum-bearing formation at a carbon disulfide concentration corresponding to between about 10 to about 25 percent of the daily crude oil production rate therefrom.

5. The method of claim 1 wherein said petroleum is produced from said production well in admixture with water, and said thiocarbonate salt is introduced into said water within said formation.

6. The method of claim 1 wherein said thiocarbonate salt is introduced into said formation at a concentration sufficient to increase the daily crude oil production rate by at least about 10 percent.

7. The method of claim 1 wherein said thiocarbonate salt is introduced into said formation at a concentration sufficient to increase the daily crude oil production rate by between about 10 and about 300 percent.

8. The method of claim 1 wherein said thiocarbonate salt is introduced into said formation as an aqueous solution and under a pressure sufficiently in excess of that within said petroleum-bearing formation to introduce said aqueous solution into said petroleum-bearing formation and said pressure is later reduced to commence production of petroleum from said petroleum-bearing formation.

9. The method of claim wherein said thiocarbonate salt is introduced into said formation at a pressure in excess of that in said petroleum-bearing formation, and said pressure is later reduced to commence production of petroleum from said formation.

10. The method of claim 1 wherein said thiocarbonate salt and/or carbon disulfide resulting from the decomposition of said thiocarbonate salt is contacted with said petroleum-bearing formation under conditions sufficient to cause oil adhering to the rocks in said formation to be liberated therefrom for recovery.

11. The method of claim 10 which further comprises acidizing said petroleum-bearing formation in conjunction with the addition of said thiocarbonate salt thereto.

12. The method of claim 1 wherein X is a substituted ammonium radical of the form $(R_1,R_2,R_3,R_4)N+$ wherein $R_1$, $R_2$, $R_3$ and $R_4$ are each independently hydrogen, or an organic radical having from 1 to about 50 carbon atoms, provided at least one of $R_1$, $R_2$, $R_3$ and $R_4$ is an organic radical.

13. The method of claim 1 wherein X is derived from organonitrogen compounds selected from the group consisting of (1) primary substituted ammonium radicals of the form $R^{15}NH_3A$, wherein $R^{15}$ is an organic radical and A is chloride or hydroxide, (2) mono, secondary and tertiary substituted polyalkoxylated amines and polyamines, (3) polyethyleneimines and (4) betaines.

14. The method of claim 1 wherein X is a primary substituted ammonium radical of the form $(R^{15}NH_3-)^+$, with $R^{15}$ being a fatty acid residue having from 10 to about 18 carbon atoms.

15. The method of claim 14 wherein sufficient thiocarbonate salt is introduced into said petroleum-bearing formation to provide a carbon disulfide concentration corresponding to at least 5 percent of the daily crude oil production rate from said formation.

16. The method of claim 14 wherein said thiocarbonate salt is introduced into said petroleum-bearing formation at a carbon disulfide concentration corresponding to between about 5 to about 50 percent of the daily crude oil production rate from said formation.

17. The method of claim 14 wherein said petroleum is produced from said production well in admixture with water, and said thiocarbonate salt is introduced into said water within said formation.

18. The method of claim 14 wherein said thiocarbonate salt is introduced into said formation at a concentration of at least about 5 percent equivalent carbon disulfide and sufficient to increase the crude oil production rate from said production well by at least about 10 percent.

19. The method of claim 14 wherein said thiocarbonate salt is introduced into said formation at a concentration sufficient to increase the daily crude oil production rate from the production well by between about 10 and about 300 percent.

20. The method of claim 19 wherein said thiocarbonate salt is introduced into said formation as an aqueous solution and under a pressure sufficiently in excess of that within said petroleum-bearing formation to introduce said aqueous solution into said petroleum-bearing formation and the pressure is later reduced to commence production of petroleum from said petroleum-bearing formation.

21. The method of claim 14 wherein said thiocarbonate salt is introduced into said formation at a pressure in excess of that in said petroleum-bearing formation, and said pressure is later reduced to commence production of petroleum from said formation.

22. The method of claim 14 wherein said thiocarbonate salt and/or carbon disulfide resulting from the decomposition of said thiocarbonate salt is contacted with said petroleum-bearing formation under conditions sufficient to cause oil adhering to the rocks in said formation to be liberated therefrom for recovery.

23. The method of claim 22 which further comprises acidizing said petroleum-bearing formation in conjunction with the addition of said thiocarbonate salt thereto.

24. The method of claim 14 wherein y is 3.

25. The method of claim 14 wherein y is 4.

26. The method defined in claim 1, wherein said thiocarbonate is contacted with water within said well, said water having a pH sufficiently low to decompose said thiocarbonate and evolve carbon disulfide.

27. The method defined in claim 1, wherein said thiocarbonate salt is introduced into said formation in combination with a sulfide selected from the group consisting of alkali metal sulfides, substituted ammonium sulfides of the formula $(R_4N)_2S$, and combinations thereof, wherein each R is independently selected from hydrogen and organic radicals, provided that at least one R is an organic radical.

28. The method defined in claim 27, wherein said sulfide comprises an alkali metal sulfide.

29. The method defined in claim 27, wherein said sulfide comprises said substituted ammonium sulfide.

30. A method for enhancing the recovery of petroleum from a petroleum-bearing formation which comprises admixing said petroleum with one or more salts of tri- and tetrathiocarbonic acid, wherein the cationic salt forming moiety of said salt is an organonitrogen radical, said thiocarbonate salt being introduced into said petroleum-bearing formation through one or more injection wells and with the petroleum being removed from said formation through one or more production wells at a daily crude oil production rate.

31. The method of claim 30 wherein said salt is a trithiocarbonate.

32. The method of claim 30 wherein said salt is a tetrathiocarbonate.

33. The method of claim 30 wherein the cationic salt-forming moiety is a substituted ammonium radical of the form $(R_1,R_2,R_3,R_4)N+$ wherein $R_1$, $R_2$, $R_3$ and $R_4$ are each independently hydrogen, or an organic radical having from 1 to about 50 carbon atoms, provided at least one of $R_1$, $R_2$, $R_3$ and $R_4$ is an organic radical.

34. The method of claim 30 wherein the cationic salt-forming moiety is derived from an organonitrogen compound selected from the group consisting of (1) a primary substituted ammonium compound of the form $R^{15}NH_3-A$, wherein A is chloride or hydroxide and $R^{15}$ is an organic radical having from 1 to about 30 carbon atoms (2) mono, secondary and tertiary substituted polyalkoxylated amines and polyamines (3) polyethyleneimines and (4) betaines.

35. The method of claim 30 wherein said cationic salt forming moiety is a primary substituted ammonium radical of the form $(R^{15}NH_3-)^+$, wherein $R^{15}$ is a fatty acid residue having from 10 to about 18 carbon atoms.

36. The method of claim 35 wherein said salt is a trithiocarbonate.

37. The method of claim 35 wherein said salt is a tetrathiocarbonate.

38. The method of claim 33 wherein said salts are admixed with said petroleum in the presence of water.

39. The method of claim 36 wherein sufficient thiocarbonate salt is introduced into said petroleum-bearing formation to provide a carbon disulfide concentration corresponding to at least 5 percent of the daily crude oil production rate from said formation.

40. The method of claim 37 wherein sufficient thiocarbonate salt is introduced into said petroleum-bearing formation to provide a carbon disulfide concentration corresponding to at least 5 percent of the daily crude oil production rate from said formation.

41. The method of claim 36 wherein said thiocarbonate salt is introduced into said petroleum-bearing formation at a carbon disulfide concentration corresponding to between about 5 and 50 percent of the daily crude oil production rate from said formation.

42. The method of claim 37 wherein said thiocarbonate salt is introduced into said petroleum-bearing formation at a carbon disulfide concentration corresponding to between about 5 and 50 percent of the daily crude oil production rate from said formation.

43. The method of claim 30 wherein said thiocarbonate salt is introduced into said petroleum in said formation at a carbon disulfide concentration corresponding to between about 10 to about 25 percent of the daily crude oil production rate from said formation.

44. The method of claim 35 wherein said thiocarbonate salt is introduced into said formation at a concentration of at least about 5 percent equivalent carbon disulfide and sufficient to increase the daily crude oil production rate from the formation by at least about 25 percent.

45. The method of claim 36 wherein said thiocarbonate salt is introduced into said formation at a concentration sufficient to increase the daily crude oil production rate from said production well by between about 25 and about 300 percent.

46. The method of claim 37 wherein said thiocarbonate salt is introduced into said formation at a concentration sufficient to increase the daily crude oil production rate from said production well by between about 25 and about 300 percent.

47. The method of claim 30 wherein said thiocarbonate salt is introduced into said formation as an aqueous solution and under a pressure sufficiently in excess of that within said petroleum-bearing formation to introduce said aqueous solution into said petroleum-bearing formation and the pressure is later reduced to commence production of petroleum from said petroleum-bearing formation.

48. The method of claim 30 wherein said thiocarbonate salt is introduced into said formation at a pressure in excess of that in said petroleum-bearing formation, and said pressure is later reduced to commence production of petroleum from said formation.

49. The method of claim 36 wherein said thiocarbonate salt and/or carbon disulfide resulting from the decomposition of said thiocarbonate salt is contacted with said petroleum under conditions sufficient to cause oil adhering to the rocks in said formation to be liberated therefrom for recovery.

50. The method of claim 37 wherein said thiocarbonate salt and/or carbon disulfide resulting from the decomposition of said thiocarbonate salt is contacted with said petroleum under conditions sufficient to cause oil adhering to the rocks in said formation to be liberated therefrom for recovery.

51. The method of claim 36 which further comprises acidizing said petroleum-bear formation in conjunction with the addition of said thiocarbonate salt thereto.

52. The method of claim 37 which further comprises acidizing said petroleum-bearing formation in conjunction with the addition of said thiocarbonate salt thereto.

53. The method defined in claim 30, wherein said thiocarbonate is contacted with water within said well, said water having a pH sufficiently low to decompose said thiocarbonate and evolve carbon disulfide.

54. The method defined in claim 30, wherein said thiocarbonate salt is introduced into said formation in combination with a sulfide selected from the group consisting of alkali metal sulfides, substituted ammonium sulfides of the formula $(R_4N)_2S$, and combinations thereof, wherein each R is independently selected from hydrogen and organic radicals, provided that at least one R is an organic radical.

55. The method defined in claim 54, wherein said sulfide comprises an alkali metal sulfide.

56. The method defined in claim 54, wherein said sulfide comprises said substituted ammonium sulfide.

57. A method for enhancing the recovery of petroleum from a well penetrating a petroleum-bearing formation comprising introducing into said formation one or more thiocarbonate salts of the form $X_zCS_y$, wherein X is a primary substituted ammonium radical of the form $(R^{15}NH_3-)^+$, with $R^{15}$ being a fatty acid residue having from 10 to about 18 carbon atoms, z is 1 when X is a divalent cationic moiety and 2 when X is a monovalent cationic moiety and y ranges from 3 to 4, said thiocarbonate salt being introduced into said petroleum-bearing formation through an injection well and with the petroleum being removed therefrom, at least in part, through a production well.

58. The method of claim 57 wherein y is 3.

59. The method of claim 57 wherein y is 4.

60. The method of claim 57 wherein said thiocarbonate salt is admixed with said petroleum in the presence of water.

61. The method defined in claim 57, wherein said thiocarbonate is contacted with water within said well, said water having a pH sufficiently low to decompose said thiocarbonate and evolve carbon disulfide.

62. The method defined in claim 57, wherein said thiocarbonate salt is introduced into said formation in combination with a sulfide selected from the group consisting of alkali metal sulfides, substituted ammonium sulfides of the formula $(R_4N)_2S$, and combinations thereof, wherein each R is independently selected from hydrogen and organic radicals, provided that at least one R is an organic radical.

63. The method defined in claim 62, wherein said sulfide comprises an alkali metal sulfide.

64. The method defined in claim 62, wherein said sulfide comprises said substituted ammonium sulfide.

65. A method for enhancing the recovery of petroleum from a production well penetrating a petroleum-bearing formation, comprising the steps of:
   (1) introducing into said formation a solution of one or more thiocarbonate salts of the form $(X)_2(CS_y)_z$, wherein X is an organonitrogen radical, y ranges from 3 to 4, and z is the valence of X, said thiocarbonate salt solution being introduced into said petroleum-bearing formation through one or more wells in said formation;
   (2) pressurizing said well to a pressure sufficient to force said salt into said formation and maintaining this pressure for at least about 15 minutes to force the salt solution into said formation; and
   (3) releasing said pressure and resuming production of oil from the well.

66. The method of claim 65 wherein the pressure is maintained for at least about 1 hour.

67. The method of claim 65 wherein the pressure is maintained for at least about 12 hours.

68. The method of claim 65 wherein the pressure is maintained for at least about 24 hours.

69. The method of claim 65 wherein the pressure is maintained for at least about 3 days.

70. The method of claim 65 wherein the pressure is maintained for at least about 1 week.

71. The method of claim 65 wherein X is a primary substituted ammonium radical of the form $(R^{15}NH_3-)^+$, with $R^{15}$ being a fatty acid residue having from about 10 to about 18 carbon atoms y is 3 and the pressure is maintained for at least about 30 minutes.

72. The method of claim 65 wherein X is a primary substituted ammonium radical of the form $(R^{15}NH_3-)^+$, with $R^{15}$ being a fatty acid residue having from 10 to about 18 carbon atoms y is 4 and the pressure is maintained for at least about 30 minutes.

73. The method defined in claim 65, wherein said thiocarbonate is contacted with water within said well, said water having a pH sufficiently low to decompose said thiocarbonate and evolve carbon disulfide.

74. The method defined in claim 65, wherein said solution comprises a sulfide selected from the group consisting of alkali metal sulfides, substituted ammonium sulfides of the formula $(R_4N)_2S$, and combinations thereof, wherein each R is independently selected from hydrogen and organic radicals, provided that at least one R is an organic radical.

75. The method defined in claim 74, wherein said sulfide comprises an alkali metal sulfide.

76. The method defined in claim 74, wherein said sulfide comprises said substituted ammonium sulfide.

* * * * *

UNITED STATES PATENT AND TRADEMARK OFFICE
CERTIFICATE OF CORRECTION

PATENT NO. : 5,076,358

DATED : December 31, 1991

INVENTOR(S) : Charles L. Kissel

It is certified that error appears in the above-identified patent and that said Letters Patent is hereby corrected as shown below:

Claim 9, column 10, line 58, after the word "claim" insert -- 1 --.

Claim 51, column 13, line 58, "bear" should be -- bearing --.

Signed and Sealed this

Twenty-second Day of June, 1993

Attest:

MICHAEL K. KIRK

*Attesting Officer*     *Acting Commissioner of Patents and Trademarks*